US 9,104,721 B2

(12) United States Patent
Kaul et al.

(10) Patent No.: US 9,104,721 B2
(45) Date of Patent: Aug. 11, 2015

(54) DEVICES AND METHODS FOR SEARCHING DATA ON DATA SOURCES ASSOCIATED WITH REGISTERED APPLICATIONS

(75) Inventors: Bhavuk Kaul, San Francisco, CA (US); Karthigesu Niranjan, Kanata (CA); David Bukurak, Ottawa (CA); Jennifer Ignacz, Malmö (SE); Shilpa Vyas, Harrow (GB); Donald James Lindsay, Mountain View, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 329 days.

(21) Appl. No.: 13/578,994

(22) PCT Filed: Feb. 15, 2011

(86) PCT No.: PCT/CA2011/050094
§ 371 (c)(1),
(2), (4) Date: Oct. 25, 2012

(87) PCT Pub. No.: WO2011/097741
PCT Pub. Date: Aug. 18, 2011

(65) Prior Publication Data
US 2013/0218923 A1    Aug. 22, 2013

Related U.S. Application Data

(60) Provisional application No. 61/304,665, filed on Feb. 15, 2010, provisional application No. 61/327,342, filed on Apr. 23, 2010.

(51) Int. Cl.
*G06F 17/30* (2006.01)
*H04M 1/725* (2006.01)

(52) U.S. Cl.
CPC .... *G06F 17/30424* (2013.01); *G06F 17/30864* (2013.01); *H04M 1/72522* (2013.01); *H04M 1/72561* (2013.01)

(58) Field of Classification Search
None
See application file for complete search history.

(56) References Cited

U.S. PATENT DOCUMENTS

| 2005/0187971 A1 | 8/2005 | Hassan et al. |
| 2007/0073656 A1 | 3/2007 | Bandi |

(Continued)

FOREIGN PATENT DOCUMENTS

| WO | WO2008127905 | 10/2008 |
| WO | WO2010138749 | 12/2010 |

OTHER PUBLICATIONS

International Searching Authority, International Preliminary Report on Patentability, issued in connection with application No. PCT/CA2011/050094, on Jun. 7, 2012 (11 pages).

(Continued)

*Primary Examiner* — Yuk Ting Choi
(74) *Attorney, Agent, or Firm* — Jon Gibbons; Fleit Gibbons Gutman Bongini & Bianco P.L.

(57) ABSTRACT

A mobile device includes a memory to store an unregistered application and corresponding unregistered application data which is unable to be searched, and a registered application and corresponding registered application data that is able to be searched. The mobile device also has a processor to convert the unregistered application and the unregistered application data to a newly registered application and newly registered application data which is able to be searched, and search the registered application data and the newly registered application data for a search term to determine whether the registered application and the newly registered application have search results associated therewith. The processor also displays applications having search results associated therewith on an application selection screen on a display, with a subset of information about the search results being displayed, and receives selection of an application via an input device. The processor also executes the selected application to present the search results on the display.

16 Claims, 13 Drawing Sheets

(56) References Cited

U.S. PATENT DOCUMENTS

| | | | |
|---|---|---|---|
| 2007/0220089 A1* | 9/2007 | Aegerter | 709/203 |
| 2007/0271527 A1* | 11/2007 | Paas et al. | 715/810 |
| 2008/0033954 A1* | 2/2008 | Brooks et al. | 707/9 |
| 2008/0214155 A1 | 9/2008 | Ramer et al. | |
| 2010/0257539 A1* | 10/2010 | Narayanan et al. | 719/311 |
| 2010/0262619 A1* | 10/2010 | Zargahi et al. | 707/770 |
| 2010/0306191 A1* | 12/2010 | LeBeau et al. | 707/723 |

OTHER PUBLICATIONS

International Searching Authority, International Search Report, issued in connection with application No. PCT/CA2011/050094, mailed Apr. 26, 2011 (5 pages).

International Searching Authority, Written Opinion of the International Searching Authority, issued in connection with application No. PCT/CA2011/050094, mailed Apr. 26, 2011 (5 pages).

Eaton, Kit, Palm Pre vs iPhone 3.0: A Feature-by-Feature Comparison, www.fastcompany.com, Mar. 17, 2009, http://www.fastcompany.com/1218515/palm-pre-vs-iphone-30-featurefeature-comparison, retrieved Sep. 3, 2010 (5 pages).

Zibreg, Christian, Android 2.0: Five reasons why it's huge, www.geek.com, Oct. 30, 2009, http://www.geek.com/articles/mobile/android-2-0-five-reasons-why-its-huge-20091030/, retrieved Sep. 3, 2010 (14 pages).

Park, Will, Palm Pre hands-on video—Live from the Palm Lounge @ CES Las Vegas 2009!, www.intomobile.com, Jan. 9, 2009, http://www.intomobile.com/2009/01/09/palm-pre-hands-on-video-live-from-the-palm-loungeces-las-vegas-2009/, retrieved Sep. 3, 2010 (7 pages).

Captain, Sean, Palm Pre Review: Don't Call it an iPhone Killer, www.ubergizmo.com, Jun. 5, 2009, http://www.ubergizmo.com/2009/06/palm-pre-review-dont-call-it-an-iphonekiller/, retrieved Sep. 3, 2010 (18 pages).

Apple.com, Search Across Your iPhone with Spotlight, or Search Contacts, Mail, Calendar, and Notes, http://web.archive.org/web/20100112143223/http://www.apple.com/iphone/iphone-3gs/search.html, retrieved Sep. 3, 2010 (2 pages).

Lebeau, M., and Rosaen, K. Quick Search Box, Android Developers, Sep. 17, 2009, http://android-developers.blogspot.ca/2009/09/introducing-quick-search-box-for.html, retrieved Sep. 3, 2010 (3 pages).

Cutler, Kim-Mai, Android's, search gets a lot richer than the iPhone's, DigitialBeat, Oct. 9, 2009, http://venturebeat.com/2009/10/09/androids-search-gets-a-lot-richer-than-theiphones/, retrieved Sep. 3, 2010 (7 pages).

Jackson, Rob, Android Search, Text-To-Speech on Android 2.0 Donut (Video), Google Android Search API, May 28, 2009, http://phandroid.com/2009/05/28/android-search-text-to-speechon-android-20-donut-video/, retrieved Jan. 29, 2013 (6 pages).

Google, example search result "watch", retrieved on Mar. 13, 2010 (1 page).

* cited by examiner

DEVICES AND METHODS FOR SEARCHING DATA ON DATA SOURCES ASSOCIATED WITH REGISTERED APPLICATIONS

CROSS-REFERENCE TO RELATED APPLICATION

This application claims the benefit of and priority to claiming priority to U.S. Provisional Application Ser. No. 61/304,665 filed Feb. 15, 2010 and U.S. Provisional Application Ser. No. 61/327,342 filed Apr. 23, 2010.

The content of the above patent application is hereby expressly incorporated by reference into the detailed description hereof.

FIELD OF THE INVENTION

The present invention relates to the field of mobile wireless communications systems, and, more particularly, to methods of searching data on mobile wireless communications devices and related methods.

BACKGROUND OF THE INVENTION

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices also allow users to send and receive electronic mail (email) messages wirelessly and access the Internet via a cellular network and/or a wireless local area network (WLAN), for example. In addition, these devices may allow users to send Short Messaging Service (SMS) messages, Personal Identification Number (PIN) messages, and instant messages.

Given the amount of information now stored on a mobile device itself, and the amount of data remotely accessible by the mobile device, a user may wish to search for a specific e-mail, media file, or contact, for example. To facilitate this, some applications that reside on a mobile device may permit users to search data managed by those applications and stored locally on the mobile device. For example, a messaging application may permit a user to search the contents of e-mail messages or text messages stored on the device, so that the user may locate messages containing a particular keyword. Other types of applications may also provide search capabilities. For example, a media player application that manages audio files (e.g. music files) stored on the device may permit a user to search information associated with music files, so that the user may find songs with a title or artist name containing a particular keyword. As a further example, an application used to manage photos stored on the device may permit a user to search photo descriptions for a particular keyword.

BRIEF DESCRIPTION OF THE DRAWINGS

For a better understanding of the various embodiments described herein and to show more clearly how they may be carried into effect, reference will now be made, by way of example only, to the accompanying drawings which show at least one example embodiment and in which.

DETAILED DESCRIPTION

Figure 1:
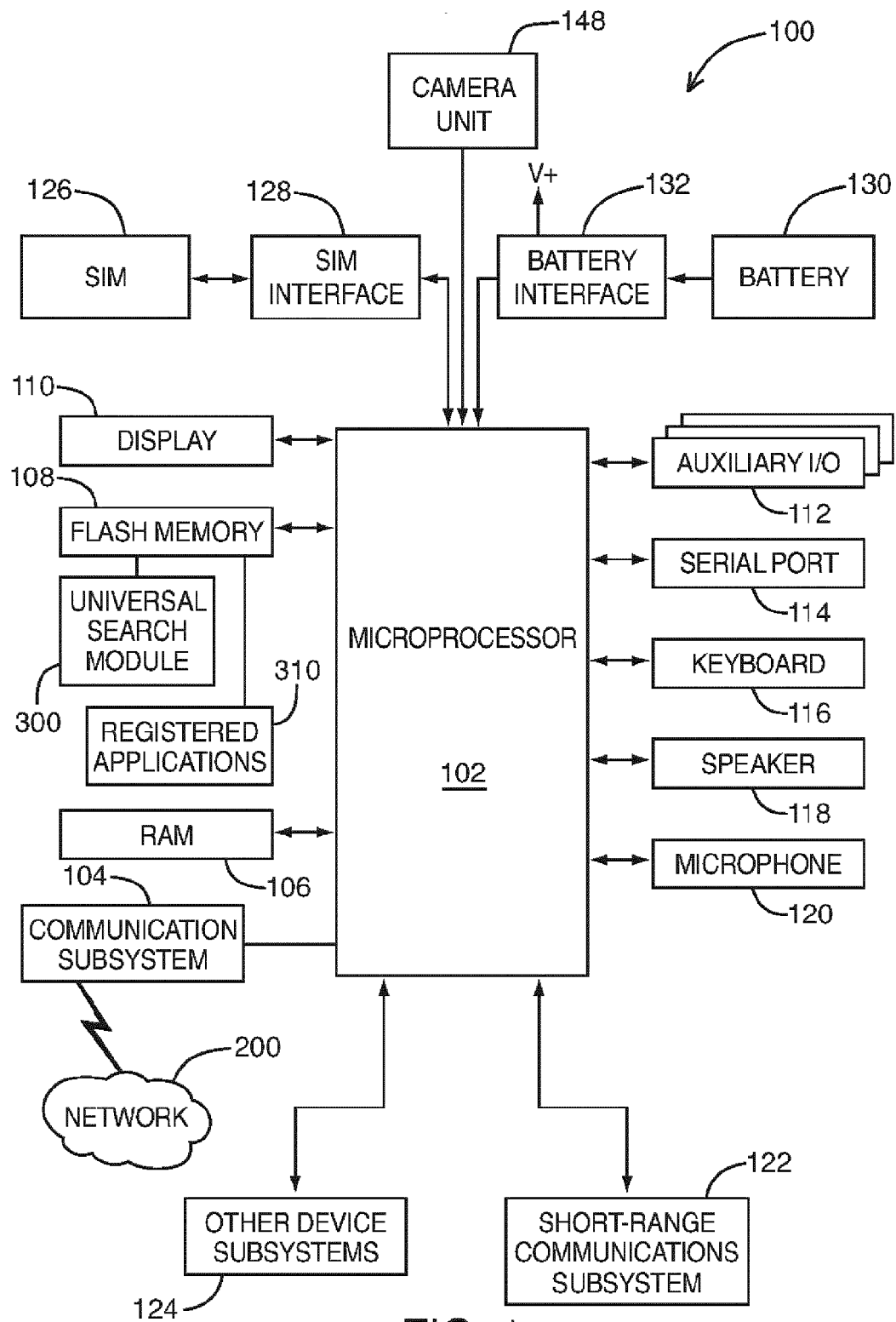
FIG. 1 is a block diagram of a mobile device in one example implementation.

The present description is made with reference to the accompanying drawings, in which example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout, and prime notation is used to indicate similar elements or steps in alternative embodiments.

Generally speaking, a mobile wireless communications device (also referred to herein as a mobile device) may include a display, and a memory configured to store at least one unregistered application and corresponding unregistered application data which is unable to be searched, and to store at least one registered application and corresponding registered application data that is able to be searched. The mobile wireless communications device may also include at least one input device, and a processor coupled to said display, said memory, and said at least one input device. The processor may be configured to convert the at least one unregistered application and the associated unregistered application data to at least one newly registered application and associated newly registered application data which is able to be searched. The processor may also be configured to search the registered application data and the newly registered application data for a search term to determine whether each of the at least one registered application and the at least one newly registered application have search results associated therewith, and display applications having search results associated therewith on an application selection screen on said display, with a subset of information about the search results being displayed. The processor may be further configured to receive selection of an application via the at least one input device, and execute the selected application to thereby present the search results on the display.

This mobile wireless communications device usefully allows the registering of applications, therefore verifying that they will function properly and can be searched properly, before the search function can search the applications. Allowing the search of an unregistered application might result in poor search results or a device malfunction.

The processor may also be configured to convert the at least one unregistered application and the associated unregistered application data based upon receipt of a registration prompt via said at least one input device. In addition, the processor may be configured to also permit the at least one registered application to access the newly registered application data of the at least one newly registered application.

In some applications, the processor may permit the at least one registered application to access the newly registered application data based upon access control privileges associated with the newly registered application. Additionally, the processor may be configured to permit the at least one registered application to access external application data for the at least one newly registered application and stored on an external server.

The processor may be further configured to present a search bar on said display based upon an input received from said at least one input device during display of the application selection screen, and to receive entry of the search term into the search bar via said at least one input device. The processor may also be configured to present the applications having search results associated therewith on said display by displaying respective icons representing the applications on said display, and by presenting an indication of a quantity of search results for each icon adjacent thereto. In some applications, the processor may also be configured to present a web search icon with the search results, and to search at least one associated web site for the search term based upon selection of the web search icon.

The memory may also be configured to store an Internet enabled application having application data associated therewith stored on an external server, and the processor may also configured to present an icon for the Internet enabled application on the application selection screen. The processor may therefore be configured to search the external server for the search term via execution of the Internet enabled application, based upon selection of the icon for the Internet enabled application. The Internet enabled application may comprise one of music streaming application and a social networking application.

A method aspect is directed to a method of searching using a mobile wireless communications device comprising a processor coupled to a display, at least one input device, and a memory. The method may include storing at least one unregistered application and corresponding unregistered application data which is unable to be searched, and to storing at least one registered application and corresponding registered application data that is able to be searched, in the memory. The method may also include converting the at least one unregistered application and the associated unregistered application data to at least one newly registered application and associated newly registered application data which is able to be searched, using the processor.

The method may further include searching the registered application data and the newly registered application data for a search term to determine whether each of the at least one registered application and the at least one newly registered application have search results associated therewith, using the processor, and displaying applications having search results associated therewith on an application selection screen on the display, with a subset of information about the search results being displayed. The method may additionally include receiving selection of an application via the at least one input device, and executing the selected application to thereby present the search results on the display, using the processor.

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 11:
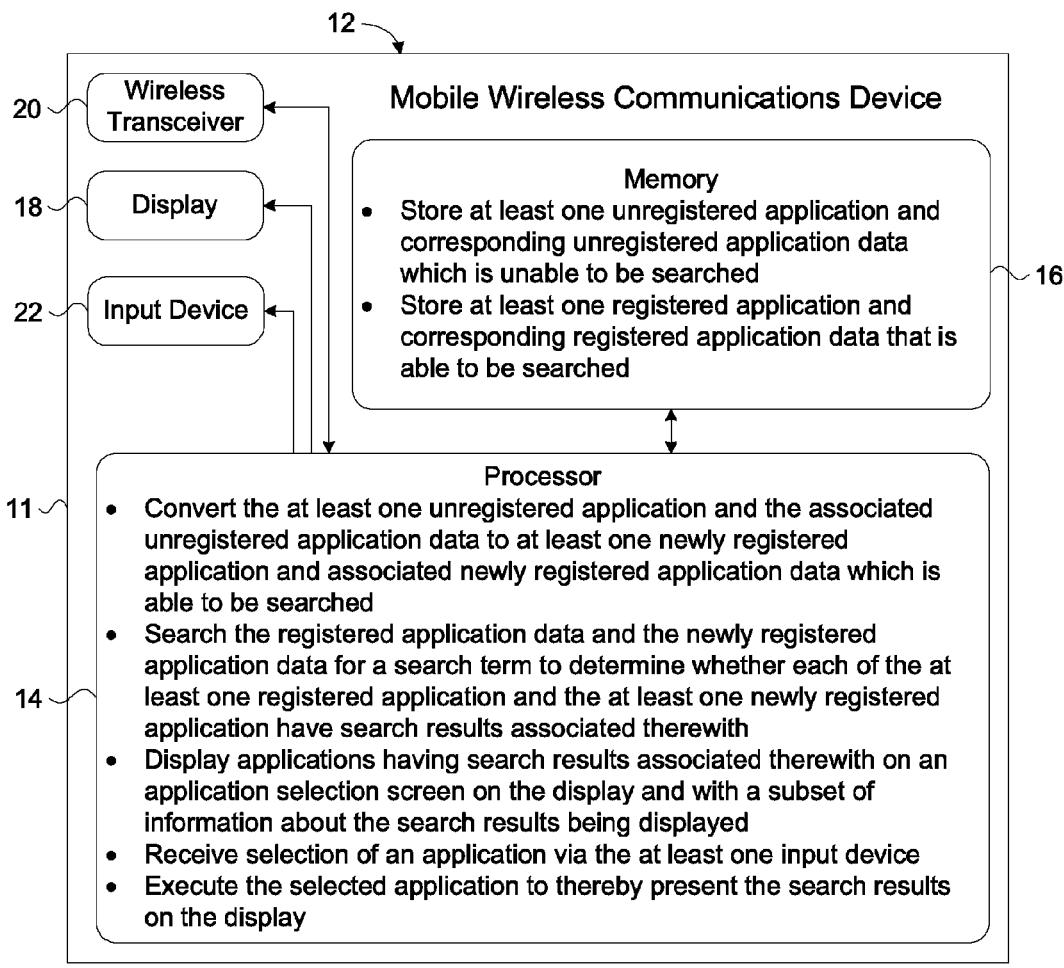
FIG. 11 is a schematic block diagram of a mobile wireless communications device according to the present disclosure.

With initial reference to FIG. 11, a mobile wireless communications device 12 is now described. The mobile wireless communications device 12 comprises a housing 11 carrying a processor 14, memory 16, display 18, wireless transceiver 20, and input device 22. The memory 16, display 18, wireless transceiver 20, and input device 22 are coupled to the processor 14.

The wireless transceiver 20 may be a cellular transceiver, and may be configured to perform both voice and data cellular communications. The wireless transceiver 20 may also have other wireless communications capability, such as WiFi and Bluetooth. The input device 22 may be a keyboard, touch sensitive pad, trackball, thumbwheel, button, microphone, or other suitable device, for example. It should be appreciated that in some applications, the display 18 may be a touch sensitive display, and may therefore serve as the input device 22.

The memory 16 may include both volatile and non-volatile portions and is configured to store at least one unregistered application and corresponding unregistered application data. The memory 16 is also configured to store at least one registered application and corresponding registered application data. The applications may be any sort of applications, include a messaging application, a contacts application, a calendar application, a notes application, and a media player application, for example. When an application is successfully registered, it indicates that the application is fully compatible with other software executed by the processor 14, such as an operating system having search functionality, and that the data for that registered application may be searched. Registration may also include a verification that the application is "authorized" by the manufacturer of the mobile wireless communications device 12, or that certain access control privileges are set.

The processor 16 is configured to convert the at least one unregistered application and associated unregistered application data to at least one newly registered application and associated newly registered application which is able to search. As will be explained below, the registration may be in response to user input, and/or further in response to verification with an external registration server.

The processor 16 then searches the registered application data and the newly registered application data for a search term to determine whether each of the at least one registered application and the at least one newly registered application have search results associated therewith. The search term may be any combination of numbers, letters and symbols, and may therefore include words and phrases, as will be appreciated by those of skill in the art. Those skilled in the art will appreciate that a variety of suitable searching algorithms may be used to perform this search.

Figure 8:
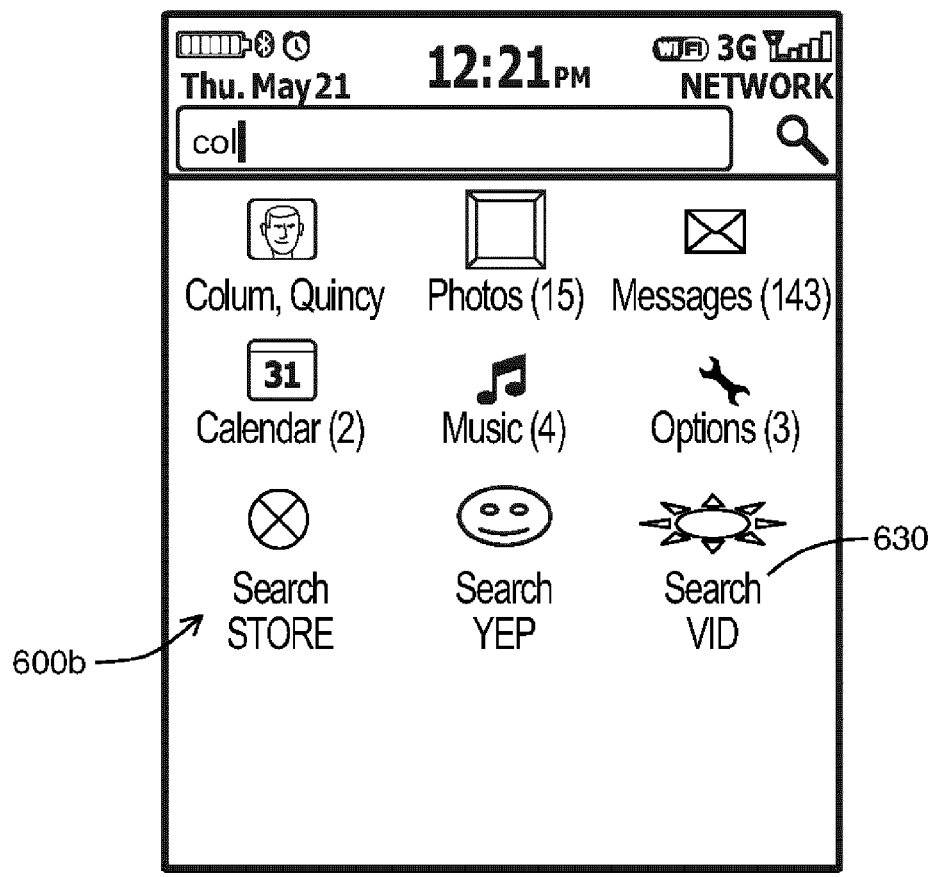

The processor 16 displays applications having search results associated therewith on a main application selection screen or "home screen" on the display 18, with a subset of information about the search results being displayed. This application selection screen presents icons representing at least some of the applications stored in the memory 16, along with labels associated with those applications. An example application selection screen showing applications having search results associated therewith is shown in FIG. 8.

The processor 14 receives selection of an application via the input device 22, and executes the selected application to thereby present the search results on the display 18. This mobile wireless communications device 12 usefully allows the registration of applications to help ensure that the applications searched are fully compatible with the device and that a user would like those applications to be searchable. In addition, this mobile wireless communications 12 usefully allows the presentation of a variety of search results of different types in an organized fashion on a single search results screen. This helps to decrease the amount of time a user spends looking through the search results for a proper entry or entries.

Figure 12:
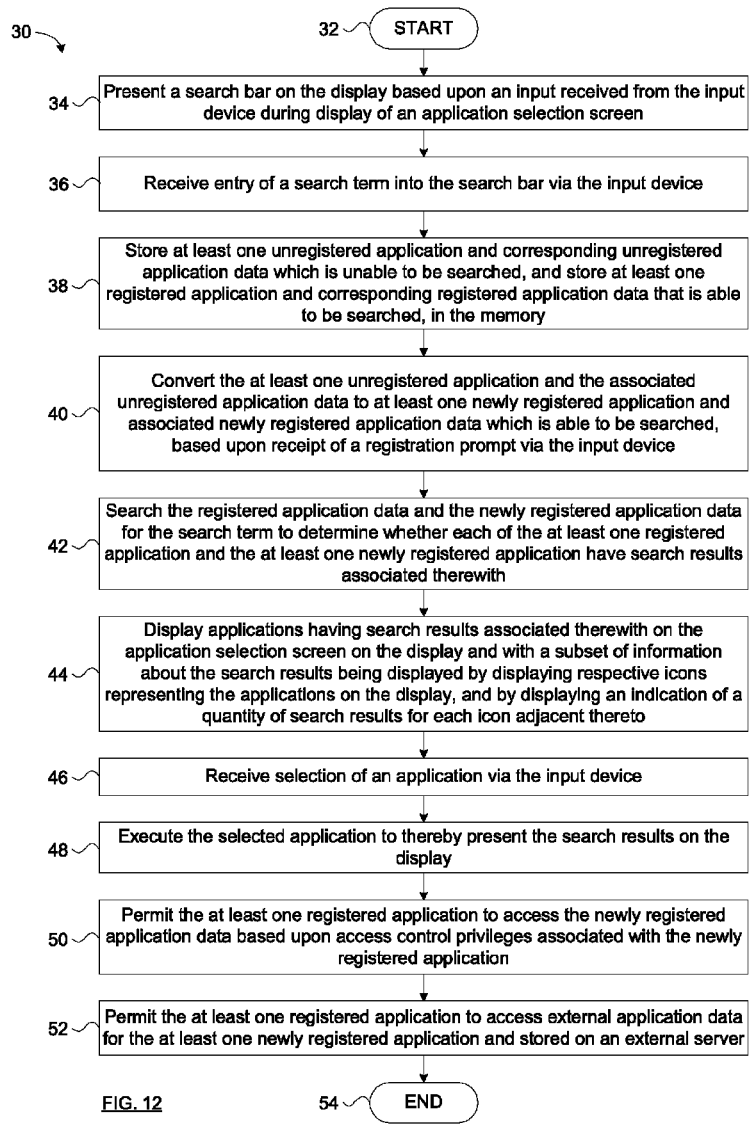
FIG. 12 is a flowchart of a method of operating the mobile wireless communications device of FIG. 11.

With reference to the flowchart 30 of FIG. 12, a method of searching the mobile wireless communications device 12 is now described. After the start (Block 32), a search bar is presented on the display based upon an input received from the input device during display of the application selection screen (Block 34). Entry of a search term is received into the search bar based upon the input device (Block 36).

At least one unregistered application and corresponding unregistered application data which is unable to be searched is stored in the memory (Block 38). At least one registered application and corresponding application data which is able to be searched is also stored in the memory (also Block 38).

The at least one unregistered application and the associated unregistered application data is then converted into at least one newly registered application and associated newly registered application which is able to be searched, based upon receipt of a registration prompt via the input device (Block 40). The registration prompt may be a simple prompt to register or not register the application, or may also include options to set a variety of application access control privileges, as will be appreciated by those of skill in the art.

Next, the registered application data and the newly registered application data are searched for the search term to thereby determine whether each of the at least one registered application and the at least one newly registered application have search results associated therewith (Block 42). Thereafter, applications having search results associated therewith are displayed on the application selection screen, with a subset of information about the search results being displayed, by displaying respective icons representing the applications on the display, and by displaying an indication of a quantity of search results for each icon adjacent thereto (Block 44). This is shown in FIG. 8, for example, where an icon and label for the messages application is displayed, and "(143)" is displayed adjacent to the label for the messages application icon, indicating that there are 143 search results for the search term from among the application data stored for the messages application.

Selection of an application is received via the input device (Block 46). The selected application is then executed to thereby present the search results on the display (Block 48). In addition, the at least one registered application is permitted to access the newly registered application data based upon access control privileges associated with the newly registered application (Block 50). Thus, registered applications may access each other's application data during execution.

In addition, the at least one registered application is permitted to access external application data for the at least one newly registered application that is stored on an external server (Block 52). The external server may be a multimedia server or social networking server, for example. Block 54 indicates the end of the method.

Figure 13:
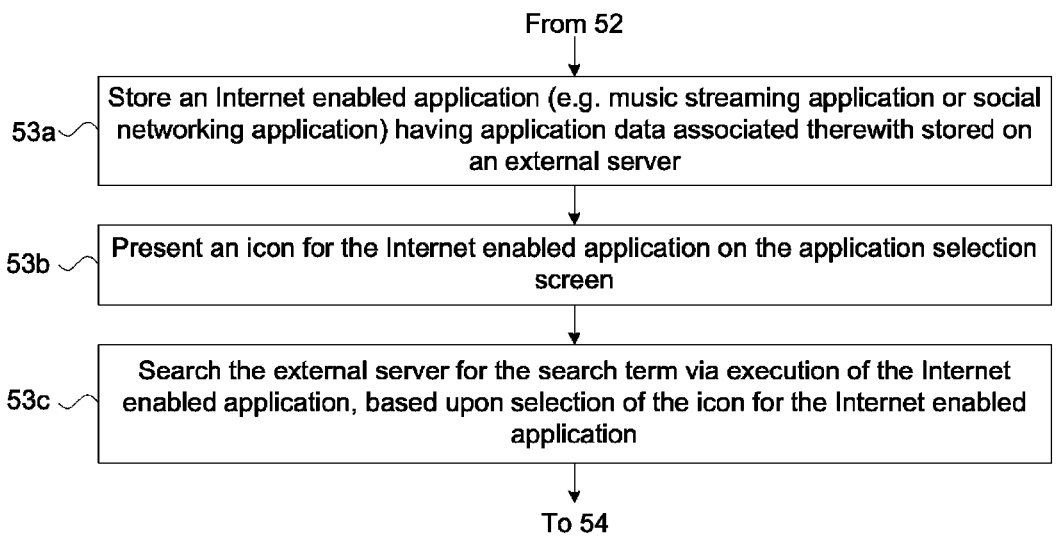
FIG. 13 is a flowchart of further features of the method of operating the mobile wireless communications device of FIG. 11.

Additional features are now described with reference to the flowchart 60 shown in FIG. 13. An Internet enabled application, such as a music streaming application or social networking application, having application data associated therewith stored on an external server is stored in the memory (Block 53*a*). An icon for the Internet enabled application is presented on the application selection screen (Block 53*b*). The external server is searched for the search term via execution of the Internet enabled application, based upon selection of the icon for the Internet enabled application (Block 53*c*). This feature provides users with a quick and easy way to extend a search outside of the data stored on the mobile wireless communications device, without requiring an exit of the search results screen, execution of an Internet enabled application, and subsequent manual entry of the search term into a search function of the Internet enabled application, as is typical in the prior art.

Referring first to FIG. 1, a block diagram of a mobile device, which can be used to implement example embodiments disclosed herein, is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behavior described herein, and it will also be understood by persons skilled in the art that the embodiments of the present disclosure are intended to use any other suitable standards that are developed in the future. The wireless link connecting communication subsystem 104 with network 200 may represent one or more different Radio Frequency (RF) channels, operating according to defined protocols specified for GSM/GPRS communications. With newer network protocols, these channels may be capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™) Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, camera unit 148, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will understand that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 (or e.g. USIM for UMTS, or CSIM or RUIM for CDMA) to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including date book (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM).

A PIM may have functionality to organize and manage data items of interest to a subscriber, such as, but not limited to, e-mail, calendar events, voice mails, appointments, and task items. A PIM application may have the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Applications may be stored in a memory or other storage on or coupled to mobile device 100, such as flash memory 108, for example. The applications may include, for example, a universal search module 300, the operation of which will be explained in more detail below. Data managed by applications may also be stored in a memory or other storage on or coupled to mobile device 100, such as flash memory 108, for example. The data may stored in, for example, a data structure 310 or other data store for storing data that identifies applications that have registered with the universal search module 300, as will be explained in more detail below.

Serial port 114 may enable a subscriber to set preferences through an external device or software application, and extend the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 may provide for communication between mobile device 100 and different systems or devices, without the use of network 200. For example, subsystem 122 may include an infrared device and associated circuits and components for short-range communication. Examples of short-range communication include standards developed by the Infrared Data Association (IrDA), Bluetooth®, and the 802.11 family of standards (Wi-F) developed by IEEE.

In use, a received signal such as a text message, an e-mail message, or web page download may be processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. Keyboard 116 may include a physical keyboard, or a virtual or "soft" keyboard implemented, for example, by way of images of keys rendered on a touch screen. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output may be accomplished primarily through speaker 118, display 110 may also be used to provide additional information such as the identity of a calling party, duration of a voice call, or other voice call related information.

Figure 2:
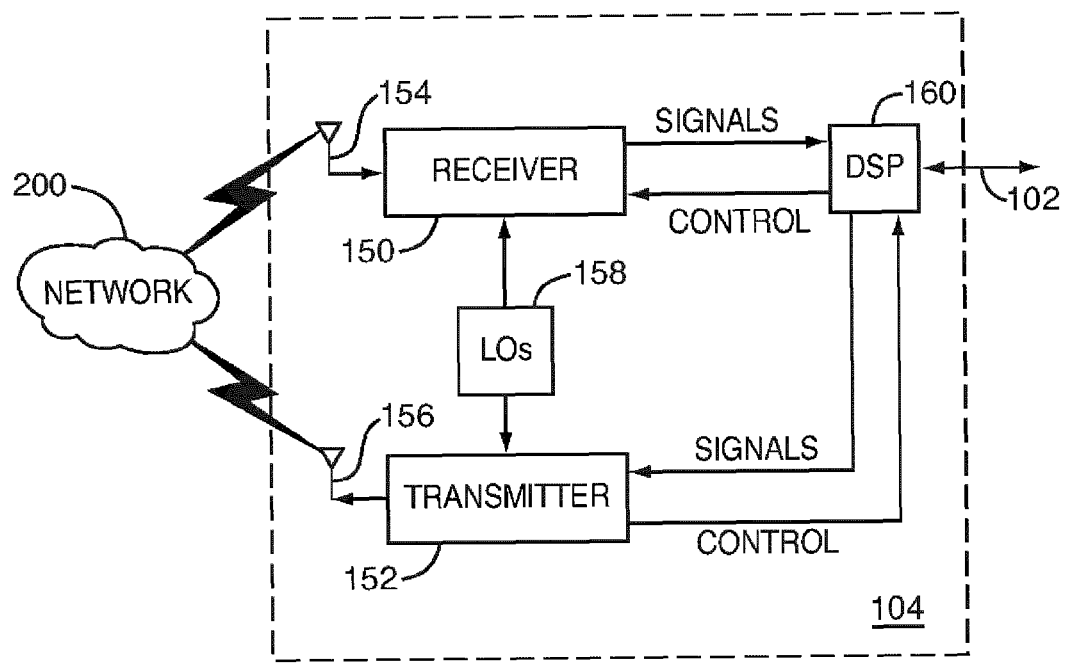
FIG. 2 is a block diagram of a communication subsystem component of the mobile device of FIG. 1.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 may be dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Figure 3:
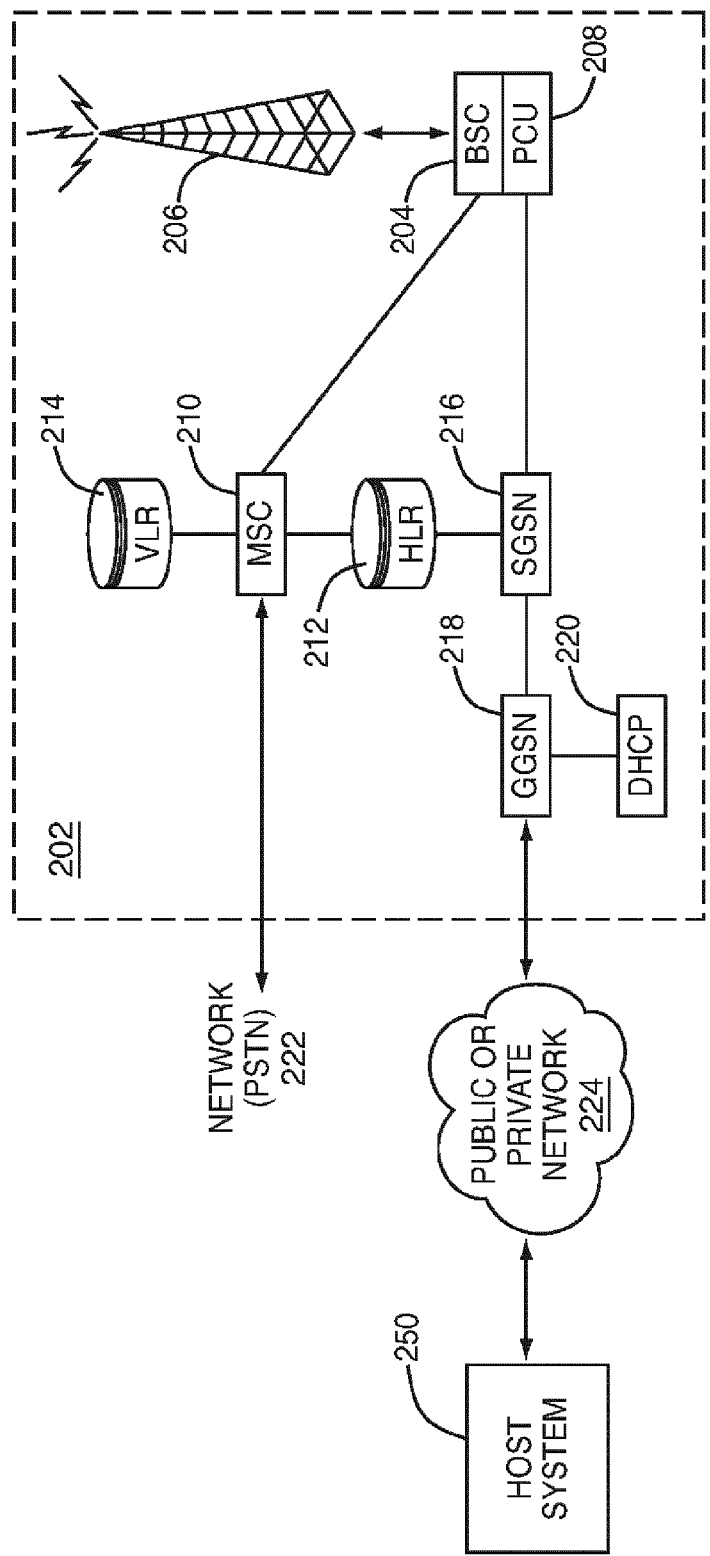
FIG. 3 is a block diagram of a node of a wireless network.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 may also contain a Packet Control Unit (PCU) 208 that connects to SGSN 216 to control segmentation, radio channel allocation and to satisfy packet switched requirements. To track mobile device location and availability for both circuit switched and packet switched management, HLR 212 may be shared between MSC 210 and SGSN 216. Access to VLR 214 may be controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 may be responsible for a group of location areas, and may store the data of the mobile devices currently in its area of responsibility in VLR 214. Further, VLR 214 may also contain information on mobile devices that are visiting other networks. The information in VLR 214 may include part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 may have similar responsibilities within wireless network 200 by keeping track of the location of each mobile device 100. SGSN 216 also performs security functions and access control for data traffic on network 200. GGSN 218 may provide internetworking connections with external packet switched networks and connect to one or more SGSNs 216 via an Internet Protocol (IP) backbone network operated within the network 200. During normal operations, a given mobile device 100 may perform a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, using a DHCP server 220 connected to the GGSN 218. There are many mechanisms for dynamic IP assignment, including the use of a combination of a Remote Authentication Dial-In User Service (RADIUS) server and a DHCP server, for example. Once the GPRS Attach is complete, a logical connection may be established from a mobile device 100, through PCU 208, and SGSN 216 to an Access Point Node (APN) within GGSN 218, for example. The APN may represent a logical end of an IP tunnel that can either access direct Internet compatible services or private network connections. The APN may also represent a security mechanism for network 200, insofar as each mobile device 100 is assigned to one or more APNs, and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel may be created and all traffic exchanged within standard IP packets using any protocol that can be supported in IP packets. This may include tunneling methods such as IP over IP as in the case with some IPSecurity (IPsec) connections used with Virtual Private Networks (VPN). These tunnels are also referred to as Packet Data Protocol (PDP) Contexts and there may be a limited number of these available in the network 200. To maximize use of the PDP Contexts, network 200 will run an idle timer for each PDP Context to determine if there is a lack of activity. When a mobile device 100 is not using its PDP Context, the PDP Context may be deallocated and the IP address returned to the IP address pool managed by DHCP server 220.

Figure 4:
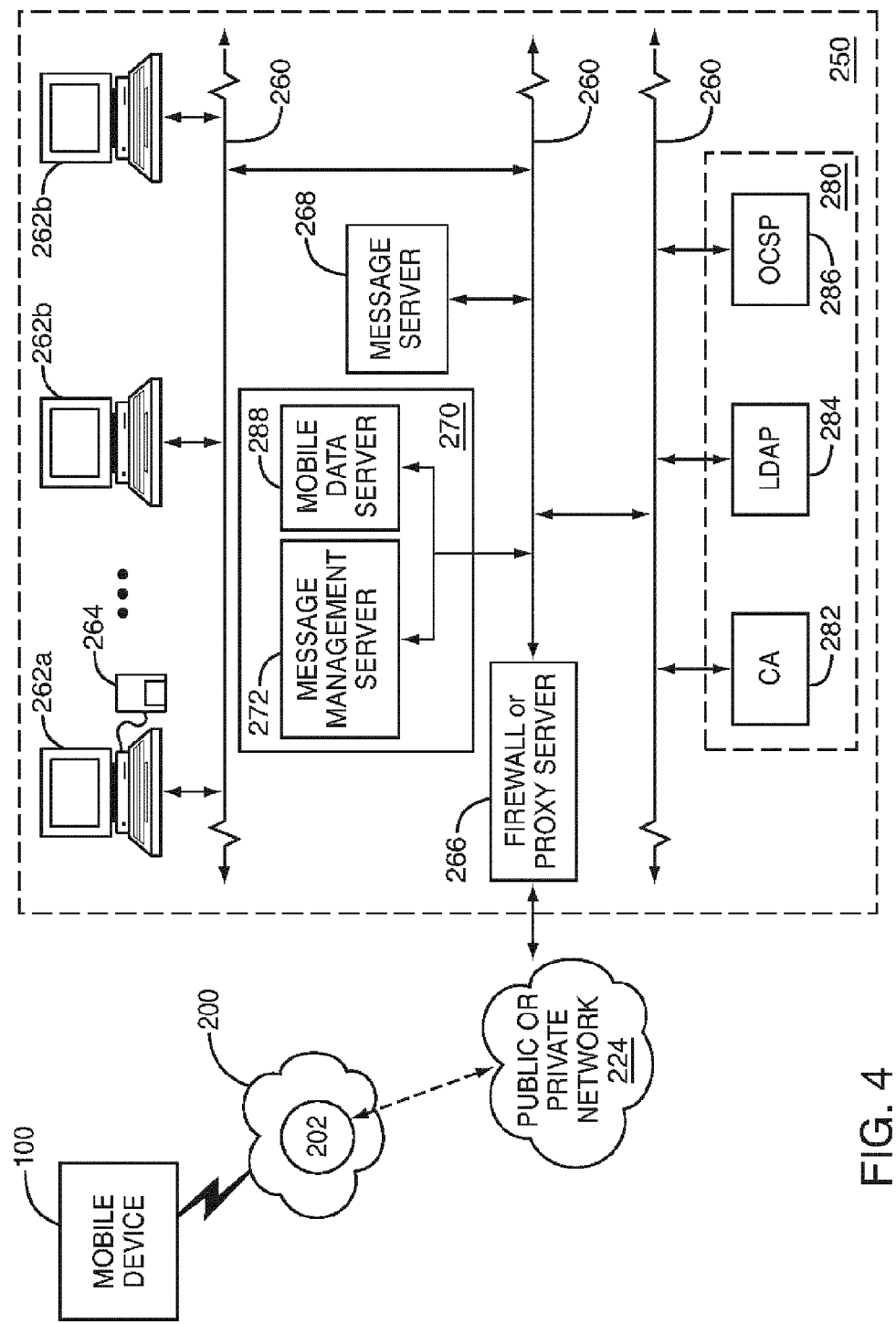
FIG. 4 is a block diagram illustrating components of a host system in one example implementation.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 may be situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates, often performed when initializing mobile device 100 for use. The information downloaded to mobile device 100 may include Secure/Multipurpose Internet Mail Extensions (S/MIME) certificates or Pretty Good Privacy (PGP) keys used in the exchange of messages, for example.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol may provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 may be initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. In some implementations, LAN 250 may comprise multiple message servers 268. Message server 268 may also be configured to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the mobile device 100. An e-mail client application operating on mobile device 100 may request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 may be automatically redirected to mobile device 100 as the message server 268 receives those messages.

To facilitate the wireless communication of messages and message-related data between mobile device 100 and components of LAN 250, a number of wireless communications support components 270 may be provided. In this example implementation, wireless communications support components 270 may comprise a message management server 272, for example. Message management server 272 may be used to specifically provide support for the management of messages, such as e-mail messages, that are to be handled by mobile devices. Generally, while messages are still stored on message server 268, message management server 272 may be used to control when, if, and how messages should be sent to mobile device 100. Message management server 272 may also facilitate the handling of messages composed on mobile device 100 that are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 is permitted to receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be configured to provide other control functions, such as only pushing certain message information or pre-defined portions (e.g. "blocks") of a message stored on message server 268 to mobile device 100. For example, when a message is initially retrieved by mobile device 100 from message server 268, message management server 272 is configured to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 may facilitate better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices are supported.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 may be configured to store public keys (e.g. in S/MIME certificates, PGP keys) of other individuals. Keys stored on a user's computer 262a may be downloaded from computer 262a to mobile device 100 through cradle 264, for example.

Mobile device 100 may also be configured to store the private key of a public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100) in a key store, for example. The sources of these certificates and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 may include a certificate authority (CA) server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be configured to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

As noted above, microprocessor 102, in addition to its operating system functions, enables execution of software applications on mobile device 100. These software applications typically include applications that control basic device operations, and may also include a wide range of other applications that have been loaded onto mobile device 100. The types of applications that can be supported by mobile device 100 can vary widely, and may include, without limitation, messaging applications (e.g. e-mail messaging, text messaging, instant messaging), media applications (e.g. video players, media streaming, picture editing or photo management applications, audio players), contact management applications, calendar applications, and so on. Each application may manage data that is stored, for example, directly on mobile device 100 (e.g. in flash memory 108). Alternatively, the data may be stored on some storage device or memory coupled to mobile device 100, either by data cable or wirelessly. Some applications may be pre-loaded onto the mobile device 100 so that they are available for use by a user of mobile device 100 upon his or her acquisition of the device, while other applications may be loaded onto mobile device 100 at some later time.

An application that has been loaded on mobile device 100 may permit users to search data managed by that application. In order to perform the search, a user may need to open that application, and select a "search" option from a menu, for example, to initiate the search of the data managed by the application.

In accordance with one broad aspect, a universal search module (e.g. universal search module 300 of FIG. 1) is provided. In operation, a microprocessor of a mobile device (e.g. microprocessor 102 of mobile device 100 of FIG. 1) executes instructions of the universal search module, which implements a search engine that facilitates a search of data made available by each of multiple applications. A search term is received from a user via a user interface provided by the universal search module, and subsequently, a search of data from multiple data sources based on that search term can be performed, with results being presented to the user via the user interface as search result data, in some format.

The universal search module may allow data managed by any of a variety of applications, which do not need to appear closely related, to be contemporaneously searched. For example, a keyword, or a subset of characters in the keyword, can form the basis of a search of not only message data stored on the mobile device being managed by a messaging application, but also song titles and artist names that have been associated with audio files stored on the mobile device. The user need not open separate applications in order to search data being managed by each different application, which may enhance user convenience.

In accordance with another broad aspect, the microprocessor is configured to initiate searches, not only of data stored on the mobile device, but also data originating from "external" or "off-device" sources. In at least one embodiment, data retrieved from the external data sources may be indexed and stored on the mobile device to facilitate more efficient searching in subsequent searches.

Accordingly, the microprocessor may be configured to search both "local" sources of data (i.e. data already stored on the mobile device) and data originating from external sources contemporaneously, in response to a search initiated by a user through the user interface of the universal search module. This may increase usability and user flexibility, as the breadth of the searches being performed can significantly increase.

In accordance with another broad aspect, the microprocessor is configured to allow searching by category. Each category may be potentially associated with a plurality of (e.g. third-party) external data sources, for example. For example, the universal search module may be configured to allow users to perform searches corresponding with one or more of the following categories, by way of illustration and without limitation: web site searches using web search engines, searches of data managed by social networks, news searches, web messaging searches, media retail site searches, map website searches, coupon searches, and others. In some embodiments, the search by category may also cause local (e.g. on-device) data sources to be searched, in addition to or alternatively to the external data sources.

In at least one embodiment, the user may be permitted to define user preferences to specify one or more "preferred" sources for searching a specific content type (e.g. to specify a particular search engine as the preferred source when a "web search" is to be performed, or to specify a particular map website as the preferred source when a "map search" is to be performed). This allows a user to customize, in advance, the external data source(s) (and in some embodiments, possibly one or more local data sources) to be searched by default, when a search by category is subsequently performed.

In accordance with another broad aspect, the universal search module provides an application programming interface (API) that is made accessible to the various software applications executing on mobile device 100. This API allows applications (e.g. applications associated with local data sources, applications associated with external data sources, or both) to interact with the universal search module so that the data provided by the respective data sources may be made available for searching.

In at least one embodiment, the mobile device is configured to allow applications, which have not been pre-loaded on the device, to be downloaded to the mobile device (e.g. via the shared network infrastructure 224 of FIG. 3). These applications may be associated with one or more external sources of data, and may be configured to make data available to the universal search module for searching. In at least one embodiment, an application associated with at least one external data source may be permitted to register with the universal search module, so that the external source(s) of data can be searched, in response to a search initiated by a user through the user interface of the universal search module.

These and other aspects and features of various embodiments will be described in greater detail below.

Figure 5:
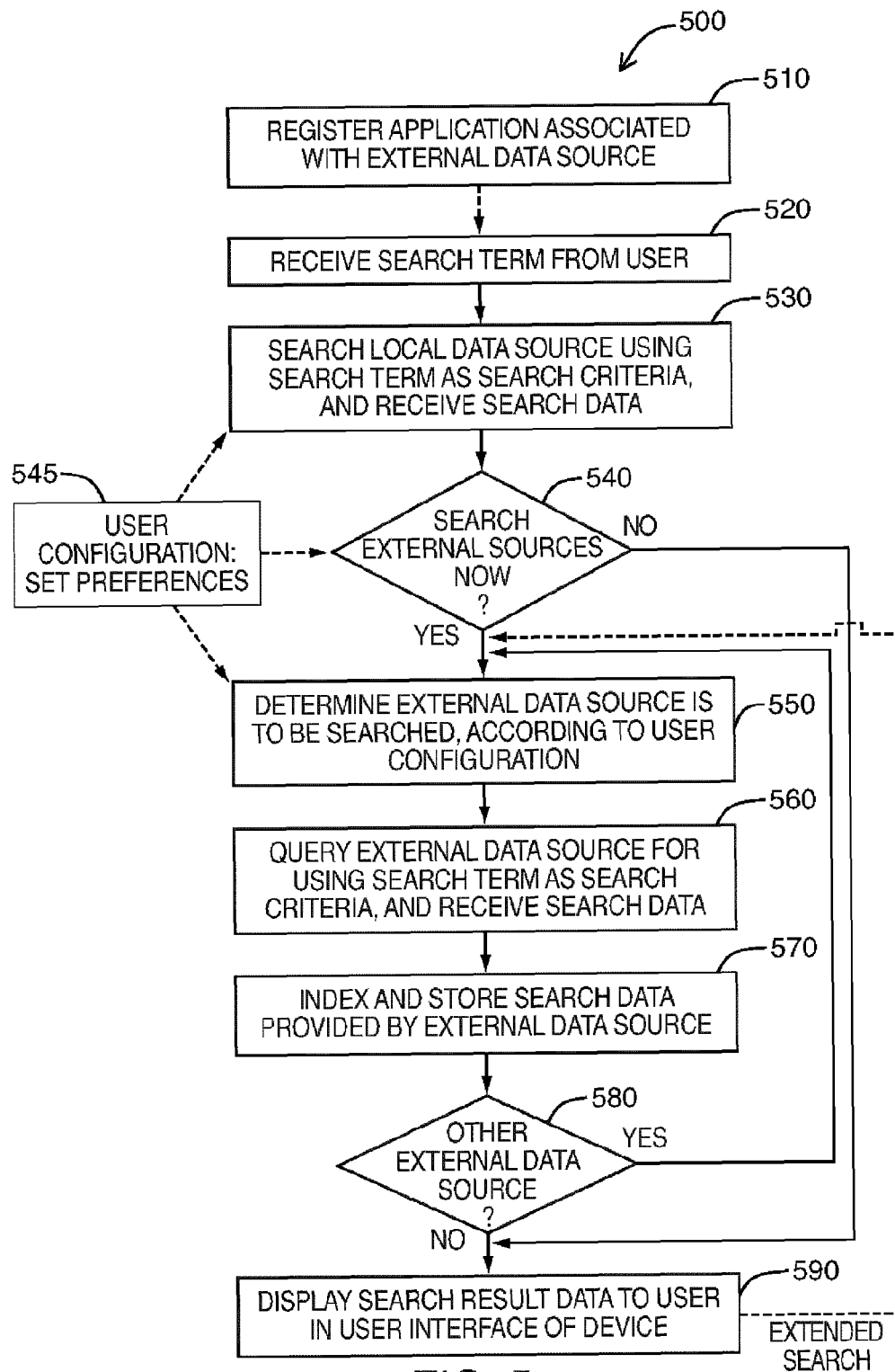
FIG. 5 is a flowchart illustrating acts of a method of searching data, in accordance with at least one embodiment.

Reference is now made to FIG. 5, in which a flowchart illustrating acts of a method of searching data is shown generally as 500, in accordance with at least one embodiment.

In at least one embodiment, at least some of the acts of method 500 are performed by a processor (e.g. microprocessor 102 of FIG. 1) executing instructions of an application (e.g. comprising one or more application modules, such as a "universal search module" in the examples described herein) residing on a mobile device (e.g. mobile device 100 of FIG.

1). A user of the mobile device may initiate a search using the universal search module (e.g. universal search module 300 of FIG. 1), which is configured to permit searching of both "locally" stored data (i.e. data stored on the mobile device) and certain external sources of data associated with applications that have registered with the universal search module, as described herein.

At 510, an application that is associated with an external source of data registers with the universal search module on the mobile device. The application may be a proprietary application originating from the manufacturer of the mobile device, or a "third-party" application that is provided by an entity other than the manufacturer, for example.

Many different types of potential external data sources exist. For example, data may be provided by a third-party web search engine, wherein web pages may be identified in a search. As a further example, data may be provided by a file sharing website, wherein songs, videos, or other multimedia may be provided and identified in a search. As a further example, data may originate from a news feed or a news website, wherein news articles, headlines, and other related news content may be identified in a search. As further examples, and without limitation, social networking sites, data feeds, map websites, web messaging applications, merchant websites, web directories, network databases, Web servers, enterprise servers (e.g. message management server 272), and engines that draw from any number of multiple data sources, which may incorporate a combination of some or all of the previously mentioned sources, may also provide data that can be subject to search, for example.

When an application is downloaded to the mobile device, the application may be configured to register with the universal search module, so that the external source of data with which the application is associated may be accessed when a search is subsequently initiated at the mobile device. Accordingly, searches of the external data source may be performed without the need for the user to independently navigate the external data source directly (e.g. to visit the website) or to run the application on the mobile device.

For example, the user may download an application associated with a music store, wherein the application provides access to a catalog containing song titles, album titles, artist names, and other data that can be searched. By registering the music store application with the universal search module, the contents of the catalog can be searched by the module without requiring the user to access the music store's website (e.g. using a browser) or to independently run the music store application to perform the search.

In one example embodiment, applications are registered with the universal search module. Once an application is registered, it may make data from the data source (e.g. local or external) associated with the application available for search.

Registering an application with the universal search module may be required in order to confirm that the application is permitted to provide data from its associated data source for searching. This may be desirable particularly where the application is a third-party application, and where certain controls are desirable to maintain device security. For example, an administrator or a user of the mobile device may wish to control, and approve, which third party applications may provide data to the universal search module for searching, independent of whether the applications might be permitted to reside and execute on the mobile device.

In accordance with at least one embodiment, the universal search module provides a specialized API that is made accessible to registered applications. Through this interface, the universal search module can communicate with the registered applications that provide access to data sources (e.g. external data sources) for searching. The act of registering an application with the universal search module may involve verifying that the application can properly interface with the specialized API.

The specialized API may have access control privileges (e.g. internal, public). Applications seeking access to the API may be verified using a code signing process, and a security check may be performed on the calling application at runtime.

In some embodiments, each application can also set its own access control privileges, for its associated data at registration time. Based on how the access control privileges for the given application itself are set, other registered applications on the mobile devices may be permitted to query the data of that given application.

As noted above, the act of registering an application generally makes the data associated with the application available for search. The registration act 510 may involve other acts, in variant embodiments. For example, registration may comprise acts that facilitate the identification and reporting of "bad" applications (e.g. applications that are misusing the API, applications that are utilizing an excess amount of processing resources, etc.).

Figure 6:
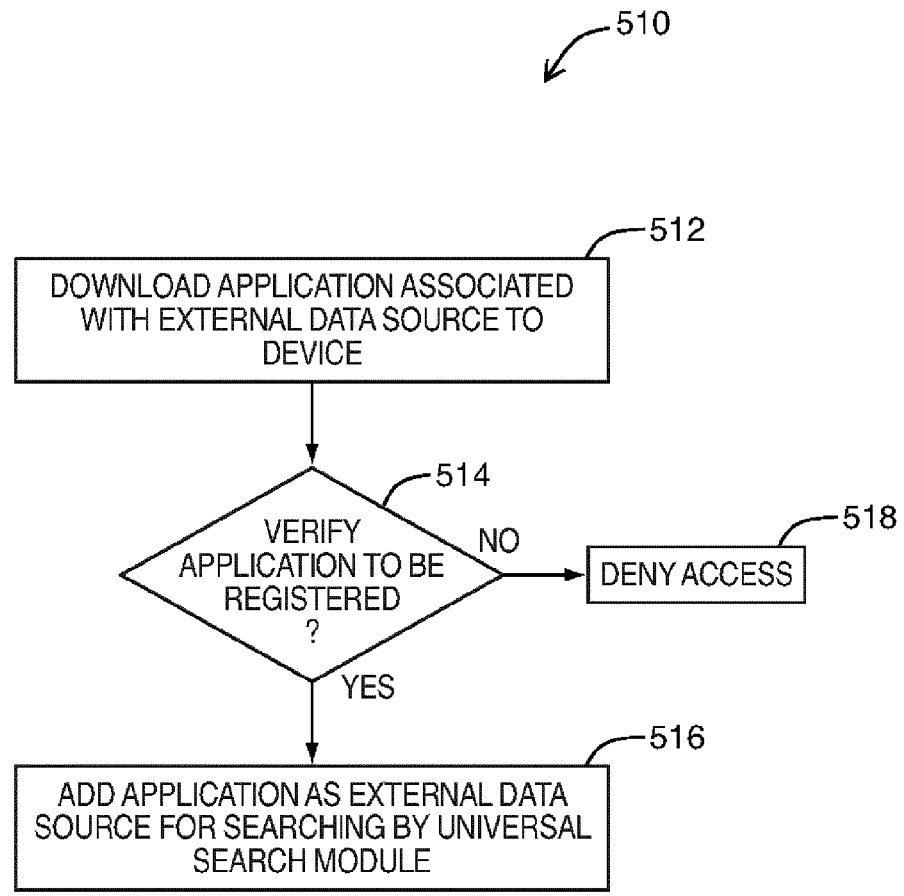
FIG. 6 is a flowchart illustrating acts performed to register an application associated with an external source of data, in accordance with at least one embodiment.

FIG. 6 is a flowchart illustrating acts performed in registering an application as an external data source, in accordance with at least one embodiment. These acts may be performed at 510 of FIG. 5, for example.

At 512, the application associated with the external data source is downloaded to the mobile device. The download may be initiated by the user, for example.

In at least one embodiment, the downloaded application is configured to trigger the registration process after its initialization, where the application wishes to utilize the specialized API provided by the universal search module, and allow access to its associated data.

At 514, verification that the application downloaded at 512 is to be registered, is performed. This may involve, for example, determining if the application is permitted to provide external data to the universal search module. For example, verification that the application has been "authorized" by the mobile device manufacturer, by being signed through a code signing process, may be performed.

If the downloaded application is to be registered, then at 516, the downloaded application is added to the list of applications that can provide searchable data to the universal search module. A data structure (e.g. registered applications data structure 310 of FIG. 1) may be employed to keep track of applications that are registered with the universal search module. Once an application is registered, the application may be called upon by the universal search module to cause a search of the associated external data source to be made, in response to the initiation of a search (e.g. by a user) at the mobile device. The data source may then also be identified in option screens and search result screens, to be displayed in the user interface provided by the universal search module.

In some embodiments, a downloaded application must be both "registered" and "activated" before it may provide data from the external data source to the universal search module. In this case, a user may be required to provide a separate user confirmation after an application is registered in order to activate the application, before the external data source can be searched. In other embodiments, once registered, the external data source may be made searchable by default, until a user subsequently exercises an "opt-out" or "deactivation" option. Once a registered application is deactivated, the external data source is not subject to search, temporarily, until the application is re-activated.

In some embodiments, a list may be displayed at the user's direction in the user interface of the mobile device, showing which registered applications have been activated at any given time, and permitting the deactivation and reactivation of particular applications.

If it is determined, at 514, that the application is not to be registered, then at 518, the application is denied access to the functionality provided by the universal search module.

In one embodiment, the universal search module may permit users to configure (e.g. at 545) whether a registered application may provide data from its associated external data source not only to the universal search module, but also to one or more other registered applications other than the universal search module, for searching purposes. The configuration may also be controlled by an administrator, through a security policy (e.g. IT policy), for example.

As an illustration, consider an application that provides access to a restaurant directory, which has been registered at 510. The application may be configured to not only permit the universal search module to search the contents of the restaurant directory, but also to allow other registered applications to search those contents as well. For example, the restaurant directory application may be configured to allow all other registered applications on the mobile device, including a meal reservation application for instance, to search the restaurant directory. As a further example, the restaurant directory application may permit access to the restaurant directory by some applications (e.g. the meal reservation service), but not others (e.g. an application that provides users with restaurant reviews).

In one embodiment, a given application allows its associated data to be accessible to other registered applications executing on the mobile device by appropriately setting its access control privileges, and informing the universal search module accordingly during the registration process. The other applications would then be permitted to make requests for data, via the universal search module, from all available data sources (e.g. all data sources, or select sources based on content type) associated with the given application, and query the data sources for data.

Referring again to FIG. 5, acts 520 to 590 are performed when a search is initiated by a user, through the user interface of the universal search module, for example. In this example, at least one application associated with an external data source has been registered at 510.

At 520, a search term is received from the user, through the user interface. A search may be performed on the received search term, even if the search term has not yet been entered in its entirety, from the user's perspective. For example, the user may wish to search for items containing the text "colleen" or "coleen", but may initially be unsure of the spelling. When the user types in a few characters, e.g. "col", in the user interface and pauses during data entry, subsequent acts of the searching method (e.g. acts 520 to 590) may be initiated using "col" as the search term. If the user then types in additional letters (e.g. "leen"), the search may be interrupted, with the flow of methods acts reverting back to step 520. The search may then continue with the expanded search term.

In some embodiments, the search is performed as a user types in a search term in the user interface. It may or may not be necessary for the user to explicitly click a search icon or to otherwise direct that a search be initiated before a search is commenced, depending on the configuration of the universal search module.

At 530, a search is initiated on data stored locally on the mobile device, based on the search term received at 520. Locally stored data may include for example, without limitation: still images and/or videos and associated data, message data (e.g. e-mail, text, instant), calendar data, audio files and associated data, program and/or utility names, and help documentation.

The user may be permitted to set user preferences (e.g. at 545), through user settings provided by the universal search module, that define what types of data (e.g. photos, message data, etc.) may be searched. Particular storage locations may also be specified for the search, in some embodiments. Otherwise, a general search of data, not restricted to particular types of data or storage locations, may be initiated. The user may be permitted to configure the universal search module to include data in encrypted data files (e.g. the user may be prompted for an access password) for searching, in certain embodiments.

At 540, a determination is made as to whether one or more external sources of data are to be automatically searched using the search term received at 520. The determination may require verifying user settings (e.g. as set by a user at 545). For example, the user configuration may indicate that the external data sources are to be automatically searched in additional to the local data sources, once the search term is received from the user in the user interface of the universal search module, without requiring further user direction. The outcome of the determination may also depend on a security policy (e.g. an IT policy) that governs the use of the mobile device. For example, an administrator may wish to control, through IT policy, that no external sources of data are to be accessed by the particular mobile device, or that only certain specified external sources of data may be accessed. Settings provided by the IT policy may be given priority over any user-defined settings.

In other embodiments, a search of an external data sources may only be permitted after a user has clicked or otherwise selected an icon representing the external data source in the user interface of the universal search module.

If it is determined that the external sources of data are to be automatically searched, then the flow of method acts proceeds to 550. Otherwise, the flow of method acts proceeds to 590, where the results of the search of locally stored data are displayed as search result data, to the user in the user interface.

Acts 550 to 580 are performed for each external source of data to be searched. First, act 550 is performed for a given external data source. It will be understood by persons skilled in the art that the search of external data sources may be initiated even if the search of local data sources in 530 has not yet been completed. In other words, searches of the external data sources and local data sources may be performed concurrently, in certain embodiments.

In some embodiments, the user may be able to "de-activate" an application that might otherwise search its associated external data source when instructed by the universal search module. Accordingly, at 550, user preferences (e.g. as set at 545) are verified, and confirmation that the user (or an administrator via IT policy, for example) has not excluded the given external data source from being searched may be made. If the given external data source is to be excluded, then the flow of method acts will proceed to 580 [flow not explicitly shown] so that the next external data source may be considered.

In some embodiments, the user may have initiated a search "by category", which directs the universal search module to initiate a search of certain external data sources that are considered to relate to the specified category. The term "category" is also referred to interchangeably herein as a "content type", as both terms imply a grouping of data sources based on the type of information content provided by the data sources.

For example, a "web search" category may be provided. In one embodiment, when a search by this category is initiated, one or more third-party search engines that provide web search capabilities (e.g. Yahoo!®, Google™, etc.) may be invoked. As a further example, a "web mail" category may be provided. In one embodiment, when a search by this category is initiated, messages stored off-device, as managed by one or more messaging service providers (e.g. Yahoo!® Mail, Gmail™, Windows Live™ Hotmail) may be searched. Other categories may be made available as search categories, including for example, without limitation: social networks, news searches, media retail site searches, map website searches, coupon searches, and others.

In variant embodiments, the data sources associated with one or more categories may change depending on the current location of the mobile device. In some embodiments, this may require that the mobile device be GPS-enabled. In these embodiments, the data sources associated with one or more categories may change dynamically in response to a change in the location of the mobile device. Alternatively, the location may be determined by the location as indicated in user settings on the mobile device.

As an example, different search engines may be associated with a "web search" category, depending if the mobile device is operating in the United States or in China. Other data sources associated with a different category may differ as well, depending on where the mobile device is operating.

Custom categories may also be defined by a user, wherein the user may associate one or more external data sources, one or more local data sources, or a combination of local and external data sources, with each custom category.

In some embodiments, when searching by category, the universal search module may be configured to search all of the data sources (e.g. all of the external data sources) associated with a user-selected category, which have registered with the universal search module.

In other embodiments, the universal search module may be configured to search only a strict subset of the data sources (e.g. a strict subset of the external data sources associated with the user-selected category) when a search by category is initiated. The subset may be defined in user preferences, which may be configured by an administrator through a security policy, in some embodiments. In other embodiments, the user may set user preferences during user configuration, at 545. The user may be permitted to select the subset of data sources to be searched when a search by category is performed.

In at least one embodiment, the user may be permitted to define user preferences to specify a "preferred" source for searching a specific content type (e.g. to specify a particular search engine as the preferred source when a search under a "web search" category is to be performed, or to specify a particular map website as the preferred source when a search under a "map search" category is to be performed). After a search by category is initiated, the user's preferred data source is initially searched (e.g. at 560), and results displayed as search result data to the user (e.g. at 590).

Accordingly, at 550, user preferences may be verified, and confirmation that the given external data source is the preferred source to be searched is made, in at least one embodiment. If the given external data source is not to be searched, then the flow of method acts will proceed to 580 [flow not explicitly shown] so that the next external data source may be considered.

In variant embodiments, the preferred source for one or more search categories may be defined by an administrator through a security policy (e.g. IT policy).

At 560, the universal search module passes the search term received at 510 to the registered application associated with the given external data source. The application is directed to query the external data source, using the search term received at 510 as search criteria, and return the results of the search to the universal search module. For example, if the given external source of data originates from a video sharing website, the search may return data that identifies videos having a title, artist name, or description that contains the search term.

The actual form of data returned from a data source may vary, depending on implementation. For example, a summary of a located item (e.g. description, listing) may be returned along with a list of available actions (e.g. open, play, forward). Each application associated with a data source can define the available actions for different data types when making its associated data searchable (e.g. during registration of the application with the universal search module).

In one embodiment, a local cache on the mobile device may be employed by the universal search module. Search results may be stored in the cache, and searching of the cached data rather than of the given external source directly may be performed at 560, in order to obtain search results more efficiently. A time-stamping or similar technique may be employed (e.g. identifying when the cached data was last updated) to ensure that the contents of the cache are not stale. The application may query the given external source at 560 rather than using the contents of the cache, if is determined that the contents of the cache are too "old".

At 570, search results obtained from the given external data source via the registered application are stored on the mobile device, and indexed to allow faster retrieval of data. The indexing of the data may be deferred to some later time (e.g. at device idle time), to minimize interference with other operations of the mobile device. A registered application may be configured to store the obtained data on the mobile device for a particular length of time or until some event occurs (e.g. the application receives a direction to delete the search results from storage on the mobile device), for example.

In at least one embodiment, actual content (e.g. videos, music tracks) that reside on external data sources will not be returned to the mobile device for storage. Instead, keywords describing the actual content and a reference to that content are returned by the search and stored on the device. The universal search module leaves it up to the registered application to decide what keywords are to be associated with the content.

At 580, it is determined whether there are any further external sources to be searched. If so, the flow of method acts proceeds back to 550.

At 590, search result data based on the results of searching one or more local data sources, one or more external data sources, or both, may be displayed to the user in the user interface provided by the universal search module.

The display of search result data at 590 may take on different forms. For example, the results of a search of a particular external data source may be presented initially in summary form. For example, the user may be notified of the number of hits that resulted from the search of this particular data source. A representative icon (e.g. a logo, if a commercial data source) accompanying the number of hits resulting from the search may also be displayed. Moreover, if the user subsequently selects the icon, a new screen displaying more detailed results of the search of the particular external data source may be displayed.

In some embodiments, search result data will be generated and displayed as the user types in a search keyword. The search result data may be presented in a variety of forms. Data returned from a data source may comprise metadata regarding the type, time, etc. associated with various data items. The universal search module can use this information when displaying results in the user interface. For example, different results may be grouped into a folder, or presented as a list or in some other format. The universal search module may display the results in a folder having the name of the application through which search data is retrieved. Contacts (e.g. as identified by contact data stored on the mobile device) may be displayed as individual items. Data retrieved from a data source associated with an application as a result of a search may be grouped inside a folder, labeled with the application name and the number of items contained in the folder. If a user of the mobile device were to click on the folder, items may be further displayed in a list, or in some other representation. Data may be provided using multiple pages. A user may also perform various other actions on search result data, depending on the data type. Selectable links may be provided in the user interface of the universal search module along with search results, allowing users to extend a search, to perform a search by category or search another specific external data source, for example. Other display configurations and navigation techniques of search result data are possible, in variant embodiments.

If the search result data being displayed is based on data that originates from multiple data sources (e.g. local, external, or both), then the results may be displayed in a grid-like summary format, in accordance with one embodiment. A representative icon, number of hits, and optionally, a description of the data source or a category associated with the search results, may be displayed for each data source represented in the grid. This layout (e.g. compared to a list format) may improve usability. Scroll bars, arrows, or other indicia may be displayed to indicate the existence of different "pages" of search result data that are not currently shown in the displayed grid, due to constraints imposed by the size of the display.

In a variant embodiment, the results presented in summary format may have been subject to grouping before their display. For example, if there are two data sources of music content to be represented, and each of the data sources have returned only a handful of hits, the results may be pre-consolidated and identified using one general "music" icon for display, with the combined number of hits identified to the user. This may improve usability.

Although FIG. 5 illustrates a particular flow of acts in the search of external data sources, it will be understood by persons skilled in the art that in variant embodiments, where there are multiple external data sources to be searched, the acts associated with the searching of the various data sources is not restricted to being performed sequentially, but may instead be performed concurrently.

Although not explicitly shown in FIG. 5, the flow of method acts may proceed back to 550, if searching of external data sources is desired after an initial set of search results have already been displayed.

For example, if at 540, it was determined that the external sources of data were not to be automatically searched, then the results displayed at 590 may initially only reflect data stored in local data sources. If the user, after considering the initial results, wishes to "extend" his or her search to include one or more additional external data sources, then the flow of method acts may proceed back to 550 so that the searches of one or more external data sources may be initiated. This "extended search" may be performed automatically for all registered external data sources, or only for particular external data sources as selected by a user or as may otherwise be pre-configured by the user or an administrator. In future iterations of method 500 where 590 is reached, the flow of method acts may proceed back to 550 again, if searching of additional external data sources is desired.

In at least one embodiment, an extended search may be performed after a user initiates a search by category. If the search by category is initiated after the search result data from a previous search has already been displayed (e.g. at 590), then the flow of method acts may proceed back to 550 so that one or more additional external data sources can be searched. The specific additional external data source(s) to be searched in response to the initiation of a search by category may depend on user preferences, as described above. The search by category would then be an extended search, which may be performed in response to the user selection of a category button displayed in the user interface provided by the universal search module (see e.g. FIGS. 9 and 10 below).

The results of the extended search may then be displayed in an updated screen. In one embodiment, a new icon that represents the external data source searched can be displayed in the updated screen, if an icon associated with that external data source is not already displayed. The number of hits located in the search by category can then be displayed with the corresponding icon. The updated search result data may be incorporated into the grid-like format for display, for example. Other formats are possible, in variant implementations.

In some embodiments, a search by category may also require that certain local data sources be searched. In that case, the flow of method acts may proceed from 590 to 530 for example (flow not shown) so that the local data sources may be searched.

Figure 7:
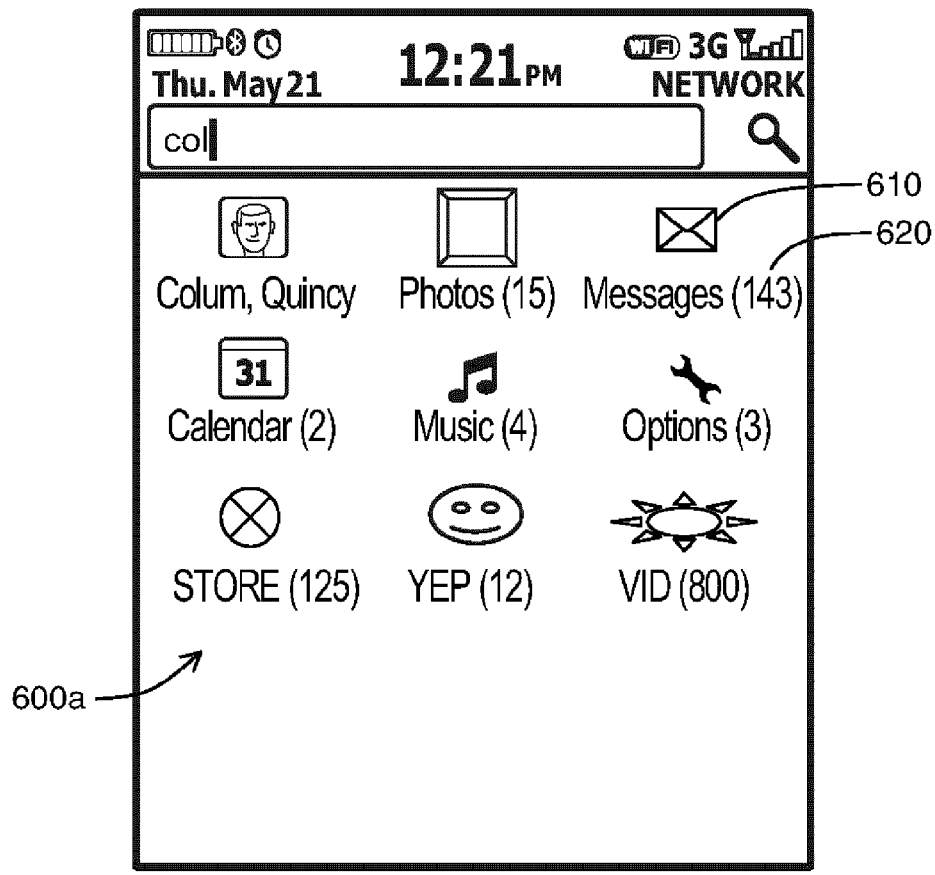
FIGS. 7 to 10 are example screen captures of the display of a mobile device as it displays search result data in a user interface, in at least one example implementation.

FIGS. 7 and 8 are example screen captures of the display of a mobile device as it displays search results in a user interface, in at least one example implementation. These screenshots are provided as examples, and other configurations of user interface elements are possible.

FIG. 7 shows a screen 600a in which a user has initiated a search in a universal search module using the term "col". The results in screen 600a are provided in a grid-like format, where each element of the grid comprises a representative icon 610, with a matching source description 620 and the number of hits based on the search term displayed underneath.

In this example, the icons associated with the sources "STORE", "YEP", and "VID" represent external sources of data associated with registered applications. In FIG. 7, the external sources were also searched, and the results of the search summarized in display 600a.

As previously noted, in at least one embodiment, results are presented as a user types in a search term. Furthermore, in at least one embodiment, results are presented initially only for data from local data sources (e.g. "on-device" contents). For data originating from an external data source (e.g. "off-device" contents), a user may be required to click on the icon, folder, or other representation of the data source in the user interface before the external data source is searched, in these embodiments.

For example, FIG. 8 shows a screen 600b, which is similar to screen 600a except that the search of external data sources was not performed using the search term "col". In this manner, the universal search module can perform a search of local data sources first, and then check with the user if an extended search that would result in a search of one or more of the external data sources is desired, before proceeding. This may conserve bandwidth and processor resources, in the event that the user ultimately deems that the search of the external data sources is not immediately necessary. In this example, the user may be provided with the option of selecting a particular displayed icon representing a specific external data source, in order to initiate a search of that external data source.

Figure 9:
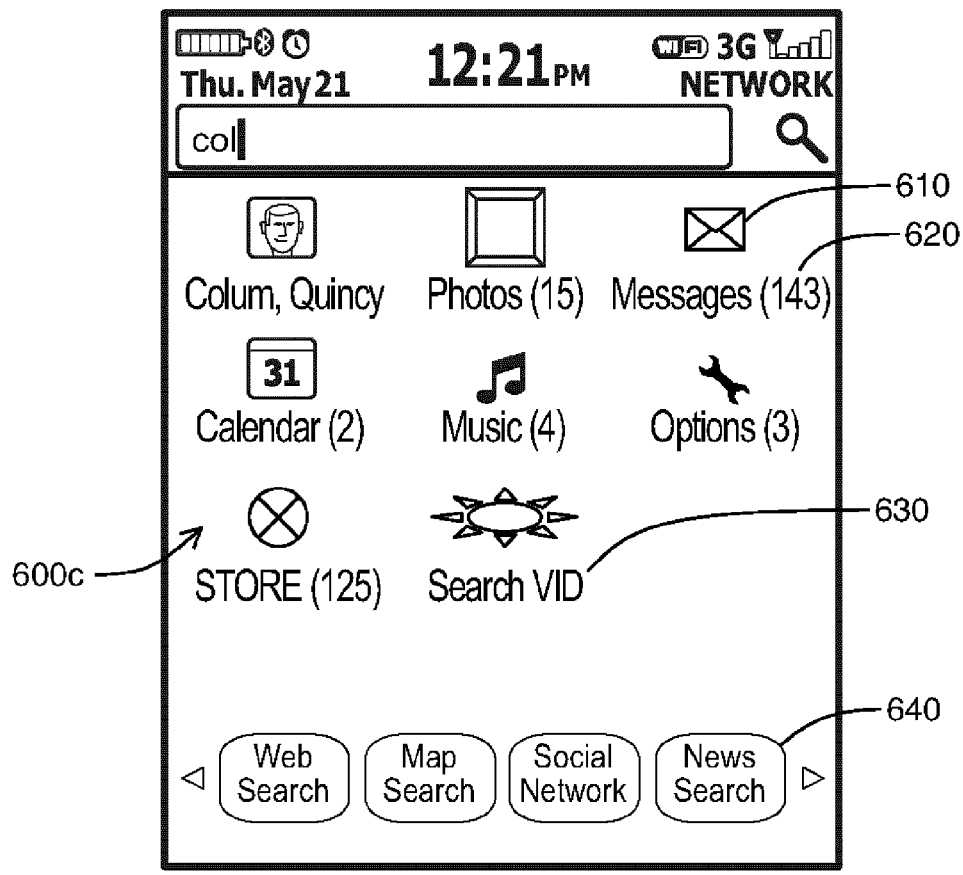
Figure 10:
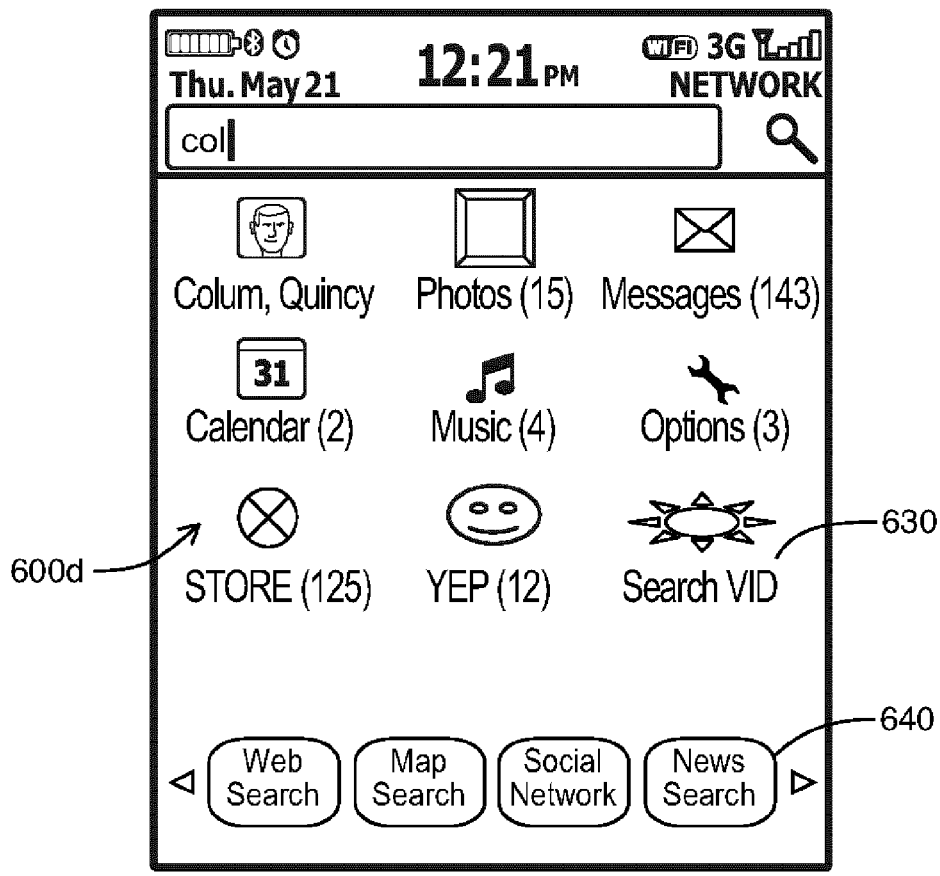

FIGS. 9 and 10 are example screen captures of the display of a mobile device as it displays search results in a user interface, in another example implementation. These screenshots are provided as examples, and other configurations of user interface elements are possible.

FIG. 9 shows a screen 600c in which a user had initiated a search in a universal search module using the term "col". The results in screen 600c are provided in a grid-like format, where each element of the grid comprises a representative icon 610, with a matching source description 620 and the number of hits based on the search term displayed underneath. In this example, the source "STORE" was searched, and an option to extend the search by searching the source "VID" is presented to the user.

Category buttons 640 are displayed to the user. In this embodiment, these buttons are displayed after a search of local data sources is performed. Each category button 640 provides the user with an option to extend the search, by performing a search by category. As described earlier herein, selecting a category button 640 may initiate a search of one or more external data sources that have been associated with the category identified by the selected category button 640.

In at least one embodiment, a preferred external data source may be associated with a given selected category, depending on user preferences, for example. If so, initiation of a search by the given category will cause that preferred external data source to be searched.

For example, FIG. 10 shows a screen 600d after the "web search" category was selected by the user. The external search engine "YEP", a preferred external data source that was associated with the "web search" category during a user configuration, was searched using the search term "col", and a new representative icon is displayed, with a corresponding description and number of hits.

Although FIGS. 9 and 10 depict that a search by category may be performed as an extended search for a given search term, i.e. after at least one search iteration has already been completed, it will be understood that a search by category may be initiated without a prior search having been completed. For example, the search term may be received from the user at 520 of FIG. 5, and a search by category initiated at that time. If the search by category does not involve searching local data sources (as may be defined in user settings), act 530 may be skipped, and method 500 may proceed directly with the remaining acts to search appropriate external data sources in performing the search by category.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

A number of embodiments have been described herein. However, it will be understood by persons skilled in the art that other variants and modifications may be made without departing from the scope of the embodiments as defined in the claims appended hereto.

That which is claimed is:

1. A mobile wireless communications device comprising:
a display;
a memory configured to store at least one unregistered application and corresponding unregistered application data which is unable to be searched, and to store at least one registered application and corresponding registered application data that is able to be searched;
at least one input device; and
a processor coupled to said display, said memory, and said at least one input device, and configured to
convert the at least one unregistered application and the associated unregistered application data to at least one newly registered application and associated newly registered application data which is able to be searched,
configure access control privileges for the newly registered application data, the access control privileges defining the at least one registered applications that are permitted to search the newly registered application data,
search, according to the access control privileges that were configured, the registered application data and the newly registered application data for a search term to determine whether each of the at least one registered application and the at least one newly registered application have search results associated therewith,
display applications, after the search, having search results associated therewith on an application selection screen on said display, with a subset of information about the search results being displayed,
receive selection of an application via the at least one input device, and
execute the selected application to thereby present the search results on the display.

2. The mobile wireless communications device of claim 1, wherein said processor is configured to convert the at least one unregistered application and the associated unregistered application data based upon receipt of a registration prompt via said at least one input device.

3. The mobile wireless communications device of claim 1, wherein said processor is configured to permit the at least one registered application to access external application data for the at least one newly registered application and stored on an external server.

4. The mobile wireless communications device of claim 1, wherein said processor is further configured to present a search bar on said display based upon an input received from said at least one input device during display of the application selection screen, and to receive entry of the search term into the search bar via said at least one input device.

5. The mobile wireless communications device of claim 1, wherein said processor is configured to present the applications having search results associated therewith on said display by displaying respective icons representing the applications on said display, and by presenting an indication of a quantity of search results for each icon adjacent thereto.

6. The mobile wireless communications device of claim 1, wherein said processor is also configured to present a web search icon with the search results, and to search at least one associated web site for the search term based upon selection of the web search icon.

7. The mobile wireless communications device of claim 1, wherein said memory is also configured to store an Internet enabled application having application data associated therewith stored on an external server; wherein said processor is also configured to present an icon for the Internet enabled application on the application selection screen; and wherein said processor is configured to search the external server for the search term via execution of the Internet enabled application, based upon selection of the icon for the Internet enabled application.

8. The mobile wireless communications device of claim 7, wherein the Internet enabled application comprises one of music streaming application and a social networking application.

9. A method of searching using a mobile wireless communications device comprising a processor coupled to a display, at least one input device, and a memory, the method comprising:
   storing at least one unregistered application and corresponding unregistered application data which is unable to be searched, and storing at least one registered application and corresponding registered application data that is able to be searched, in the memory;
   converting the at least one unregistered application and the associated unregistered application data to at least one newly registered application and associated newly registered application data which is able to be searched, using the processor;
   configuring access control privileges for the newly registered application data, the access control privileges defining the at least one registered applications that are permitted to search the newly registered application data,
   searching, according to the access control privileges that were configured, the registered application data and the newly registered application data for a search term to determine whether each of the at least one registered application and the at least one newly registered application have search results associated therewith, using the processor;
   displaying applications, after the search, having search results associated therewith on an application selection screen on the display, with a subset of information about the search results being displayed;
   receiving selection of an application via the at least one input device; and
   executing the selected application to thereby present the search results on the display, using the processor.

10. The method of claim 9, wherein the at least one unregistered application and the associated unregistered application data are converted based upon receipt of a registration prompt via the at least one input device.

11. The method of claim 9, further comprising permitting the at least one registered application to access external application data for the at least one newly registered application and stored on an external server, using the processor.

12. The method of claim 9, further comprising presenting a search bar on the display based upon an input received from the at least one input device during display of the application selection screen, and receiving entry of the search term into the search bar via the at least one input device, using the processor.

13. The method of claim 9, wherein the processor is configured to present the applications having search results associated therewith on the display by displaying respective icons representing the applications on the display, and by presenting an indication of a quantity of search results for each icon adjacent thereto.

14. The method of claim 9, further comprising presenting a web search icon with the search results, and searching at least one associated web site for the search term based upon selection of the web search icon, using the processor.

15. The method of claim 9, further comprising storing an Internet enabled application having application data associated therewith stored on an external server in the memory; further comprising presenting an icon for the Internet enabled application on the application selection screen, using the processor; and further comprising searching the external server for the search term via execution of the Internet enabled application, based upon selection of the icon for the Internet enabled application, using the processor.

16. The method of claim 15, wherein the Internet enabled application comprises one of music streaming application and a social networking application.

* * * * *